(12) United States Patent
Headrick et al.

(10) Patent No.: US 12,280,865 B2
(45) Date of Patent: Apr. 22, 2025

(54) WINDOW ROLLER SHADE AND DIMMING PANE

(71) Applicant: Textron Aviation Inc., Wichita, KS (US)

(72) Inventors: Jonathan Lynn Headrick, Peck, KS (US); Joshua Lawrence Bell, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/452,855

(22) Filed: Aug. 21, 2023

(65) Prior Publication Data

US 2024/0059392 A1    Feb. 22, 2024

Related U.S. Application Data

(60) Provisional application No. 63/373,113, filed on Aug. 22, 2022.

(51) Int. Cl.
  *B64C 1/14* (2006.01)
(52) U.S. Cl.
  CPC .................. *B64C 1/1492* (2013.01)
(58) Field of Classification Search
  CPC ....... B64C 1/14; B64C 1/1476; B64C 1/1484; B64C 1/1492; A47H 5/0325; E06B 9/40; E06B 9/42; E06B 9/68; E06B 9/262; E06B 9/264; E06B 2009/2643; E06B 2009/6809; E06B 2009/6818; E06B 2009/6836; E06B 2009/6845; E06B 2009/6872; E06B 2009/6881

USPC ........................................ 160/29; 244/129.3
See application file for complete search history.

(56) References Cited

U.S. PATENT DOCUMENTS

| | | | |
|---|---|---|---|
| 5,404,926 A | 4/1995 | Ojima et al. | |
| 6,230,784 B1 * | 5/2001 | Sanz | B64C 1/1484 160/171 |
| 7,450,294 B2 | 11/2008 | Weidner | |
| 7,534,016 B2 * | 5/2009 | Stavaeus | B64C 1/1484 362/471 |
| 7,690,414 B2 * | 4/2010 | Knowles | B60J 1/2025 160/90 |
| 7,746,037 B2 * | 6/2010 | Stavaeus | B60J 3/04 359/227 |

(Continued)

FOREIGN PATENT DOCUMENTS

| | | |
|---|---|---|
| EP | 2845796 A1 | 3/2015 |
| WO | 2014011395 A1 | 1/2014 |

*Primary Examiner* — Joshua E Rodden
(74) *Attorney, Agent, or Firm* — Avek IP, LLC

(57) ABSTRACT

A window roller shade and dimming pane assembly includes a rigid frame having a first side member on a first side and a second side member on a second side opposite the first side. An outer pane and an inner pane are disposed within the rigid frame with a gap between the outer pane and the inner pane. A roller shade includes a motor for rolling and unrolling the roller shade. A first constant force spring and a second constant force spring are each configured to pull the roller shade downwardly through the gap while the motor is unrolling the roller shade. A dimming film is disposed on the inner pane for dimming light through the inner pane. A window interface is operatively coupled to the inner pane for receiving touch input for controlling the dimming film and the roller shade.

9 Claims, 8 Drawing Sheets

(56) References Cited

U.S. PATENT DOCUMENTS

| | | | |
|---|---|---|---|
| 8,836,263 B2 | 9/2014 | Berman et al. | |
| 9,045,215 B2* | 6/2015 | Knowles | E06B 9/302 |
| 9,606,412 B2* | 3/2017 | Geerlings | G02B 5/1842 |
| 9,650,141 B2* | 5/2017 | Fagan | B64D 11/0015 |
| 9,677,329 B2* | 6/2017 | Knowles | E06B 9/74 |
| 10,705,402 B2 | 7/2020 | Whittingham et al. | |
| 10,754,219 B2 | 8/2020 | Ash et al. | |
| 12,017,749 B2* | 6/2024 | Diaz | B64C 1/1492 |
| 2004/0250964 A1* | 12/2004 | Carmen, Jr. | H05B 47/17 |
| | | | 160/120 |
| 2004/0262453 A1* | 12/2004 | Sanz | B60J 1/2041 |
| | | | 244/129.3 |
| 2009/0314439 A1* | 12/2009 | Waters | B64C 1/1492 |
| | | | 160/310 |
| 2010/0126676 A1* | 5/2010 | Tischer | E06B 9/262 |
| | | | 160/368.1 |
| 2013/0161971 A1* | 6/2013 | Bugno | B64C 1/1484 |
| | | | 296/97.2 |
| 2014/0048219 A1* | 2/2014 | Knowles | A47H 5/0325 |
| | | | 160/331 |
| 2019/0001793 A1 | 1/2019 | Zeidan | |
| 2020/0283151 A1* | 9/2020 | Key | B64D 13/08 |
| 2020/0369361 A1* | 11/2020 | Spencer | B64D 11/0015 |

* cited by examiner

WINDOW ROLLER SHADE AND DIMMING PANE

CROSS-REFERENCE TO RELATED APPLICATIONS

This application claims the benefit of priority of U.S. Provisional Patent Application No. 63/373,113, entitled Window Roller Shade and Dimming Pane and filed on Aug. 22, 2022, the disclosure of which is herein incorporated by reference in its entirety.

BACKGROUND

1. Field

Embodiments of the invention relate to aircraft windows, and specifically to shading and dimming means employed on aircraft windows.

2. Related Art

Different types of electric roller shades and dimmable windows are known. For example, International Application Publication WO 2014/011395 to Snider et al. discloses a window assembly with a conductive shading surface and an electrically deployed roller shade disposed between an inner windowpane and an outer windowpane. European Patent Application Publication EP 2,845,796 to Apdalhaliem et al. discloses a heated roller shade between an interior wall and an exterior wall of an aircraft. U.S. Publication No. 2019/0001793 to Zeidan discloses an automatic sunscreen system for vehicle windows comprising roller shades. U.S. Pat. No. 5,404,526 to Ojima et al. discloses a roller shade with guides configured for use with non-rectangular windows. U.S. Pat. No. 7,450,294 to Weidner discloses a multi-color electrochromic display. U.S. Pat. No. 7,746,037 to Stavaeus et al. discloses an electric window dimming device for an aircraft window. U.S. Pat. No. 8,836,263 to Berman et al. discloses automated control of shades and variable characteristics of glass. U.S. Pat. No. 10,705,402 to Whittingham et al. discloses electrochromic dimming of aircraft windows. U.S. Pat. No. 10,754,219 to Ash et al. discloses an electro-optic device with independently controlled dimming regions.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a window roller shade and dimming pane assembly includes: a rigid frame having a first side member on a first side and a second side member on a second side opposite the first side; an outer pane and an inner pane within the rigid frame, wherein a gap exists between the outer pane and the inner pane; a roller shade disposed at a top of the rigid frame, wherein the roller shade includes a motor for rolling and unrolling the roller shade; a first constant force spring rotatably coupled to a bottom portion of the first side member and fixedly coupled to a bottom of the roller shade; a second constant force spring rotatably coupled to a bottom portion of the second side member and fixedly coupled to a bottom of the roller shade, wherein the first constant force spring and the second constant force spring are configured to pull the roller shade downwardly through the gap while the motor is unrolling the roller shade; a dimming film disposed on the inner pane for dimming light through the inner pane; and a window interface operatively coupled to the inner pane for receiving touch input for controlling the dimming film and the roller shade.

In another embodiment, a motorized window roller shade control method includes: setting a reference position of a window roller shade via a controller; sending a first signal from the controller to a motor operatively coupled to the window roller shade, wherein the first signal provides a command to raise or lower the window roller shade; raising or lowering the window shade by operating the motor based on the signal from the controller; sending a second signal from the controller to the motor, wherein the second signal provides a command to stop the motor; and determining a position of the window roller shade, including: counting a number of axle rotations of the window roller shade via an optical encoder; and calculating a position of a bottom edge of the window roller shade based on the number of axle rotations and the reference position.

In yet another embodiment, a motorized roller shade control method for a window includes: setting a reference position of the window roller shade via a controller; sensing a touch input at an inner pane of the window with a sensor; determining a location of the touch input via the controller based on input from the sensor; sending a first signal from the controller to a motor operatively coupled to the roller shade, wherein the first signal provides a command to raise or lower the roller shade; raising or lowering the shade by operating the motor based on the signal from the controller; monitoring a position of the roller shade, including: counting a number of axle rotations of the roller shade via an optical encoder; and calculating a position of a bottom edge of the roller shade based on the number of axle rotations and the reference position; and sending a second signal from the controller to the motor, wherein the second signal provides a command to stop the motor.

BRIEF DESCRIPTION OF THE DRAWING FIGURES

Embodiments of the invention are described in detail below with reference to the attached drawing figures, wherein.

Figure 1:
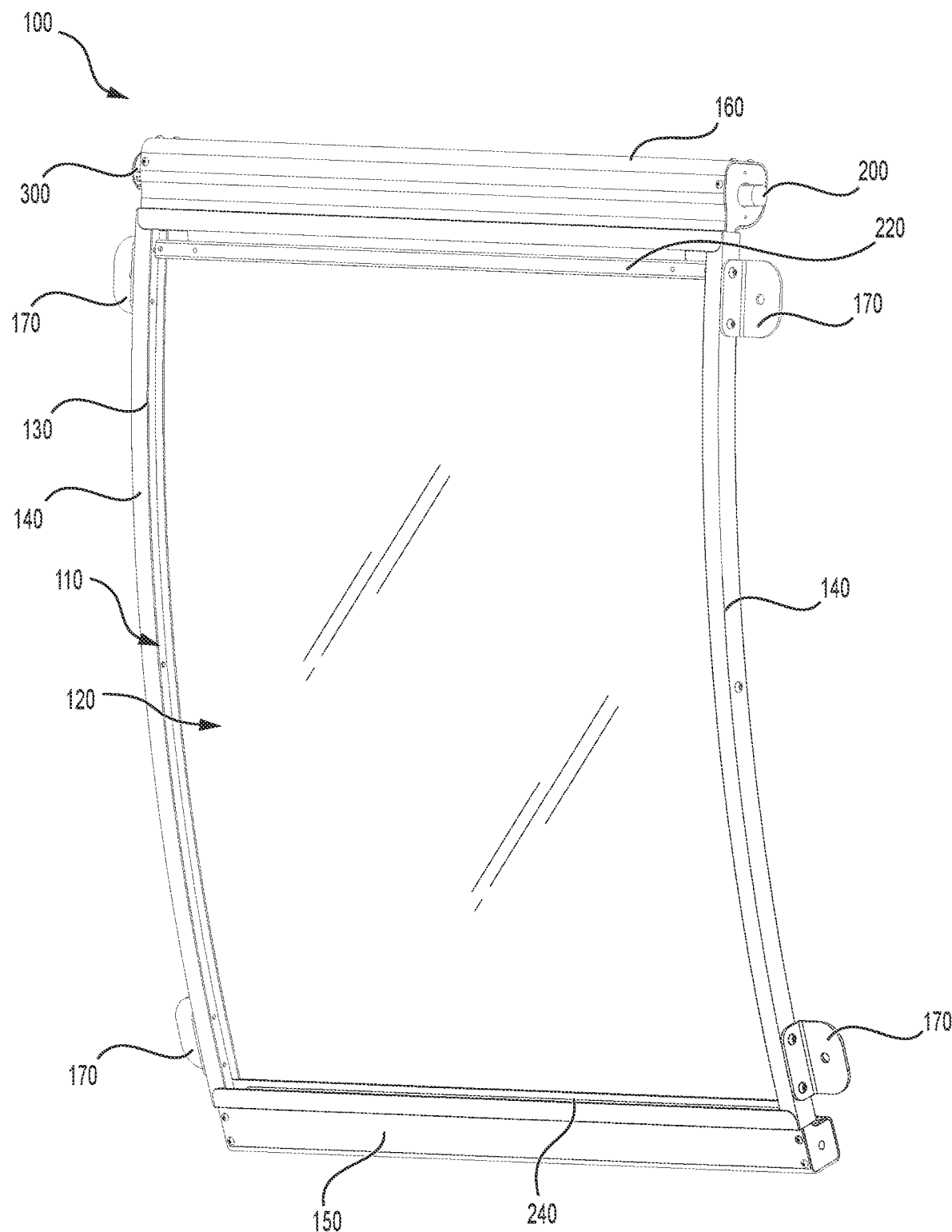
FIG. 1 is a perspective view showing an outer side of a window roller shade and dimming pane assembly, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Passenger aircraft typically include cabin windows that enable passengers to see outside of the aircraft. On commercial passenger aircraft, a simple single-piece solid shade is typically provided on passenger windows. The single-piece solid shade does not provide partial dimming of external light and therefore do not reduce the level of external light through the window without obstructing the passenger's view.

The present disclosure relates to windows comprising a motorized shade for use on passenger aircraft. The window comprises two windowpanes that sandwich the motorized shade. The motorized window shade may be configured to operate via a low-profile electrical switch panel, a contactless position sensor, or a capacitive touch technology, for example. A rigid frame surrounding the windowpanes and motorized shade secures the windowpanes to prevent the window from warping or twisting. Mounting points are provided on the rigid frame for securing the window to an aircraft frame. A housing is provided for mounting the motor and other electrical components, such as a sensor for monitoring a height of the shade, to the rigid frame. In embodiments, one of the windowpanes is dimmable for partially blocking light, as further described below.

FIG. 1 shows an outer side of an exemplary window roller shade and dimming pane assembly 100. The window roller shade and dimming pane assembly 100 comprises an outer pane 110 and an inner pane 120 held together by a frame 130. Frame 130 comprises a strong, rigid material such as aluminum, aluminum alloy or carbon fiber material. Frame 130 comprises two side members 140, bottom cover 150, and top cover 160. Bottom cover 150 and top cover 160 may each comprise an aluminum extrusion housing, in embodiments. A plurality of mounting units 170 are used to mount window assembly 100 to the frame of an aircraft via fasteners. The fasteners may include screws, bolts, rivets, glue, or other mounting means without departing from the scope hereof. In an embodiment, four mounting units 170 are screwed to side members 140 of frame 130, as shown in FIG. 1.

Figure 2:
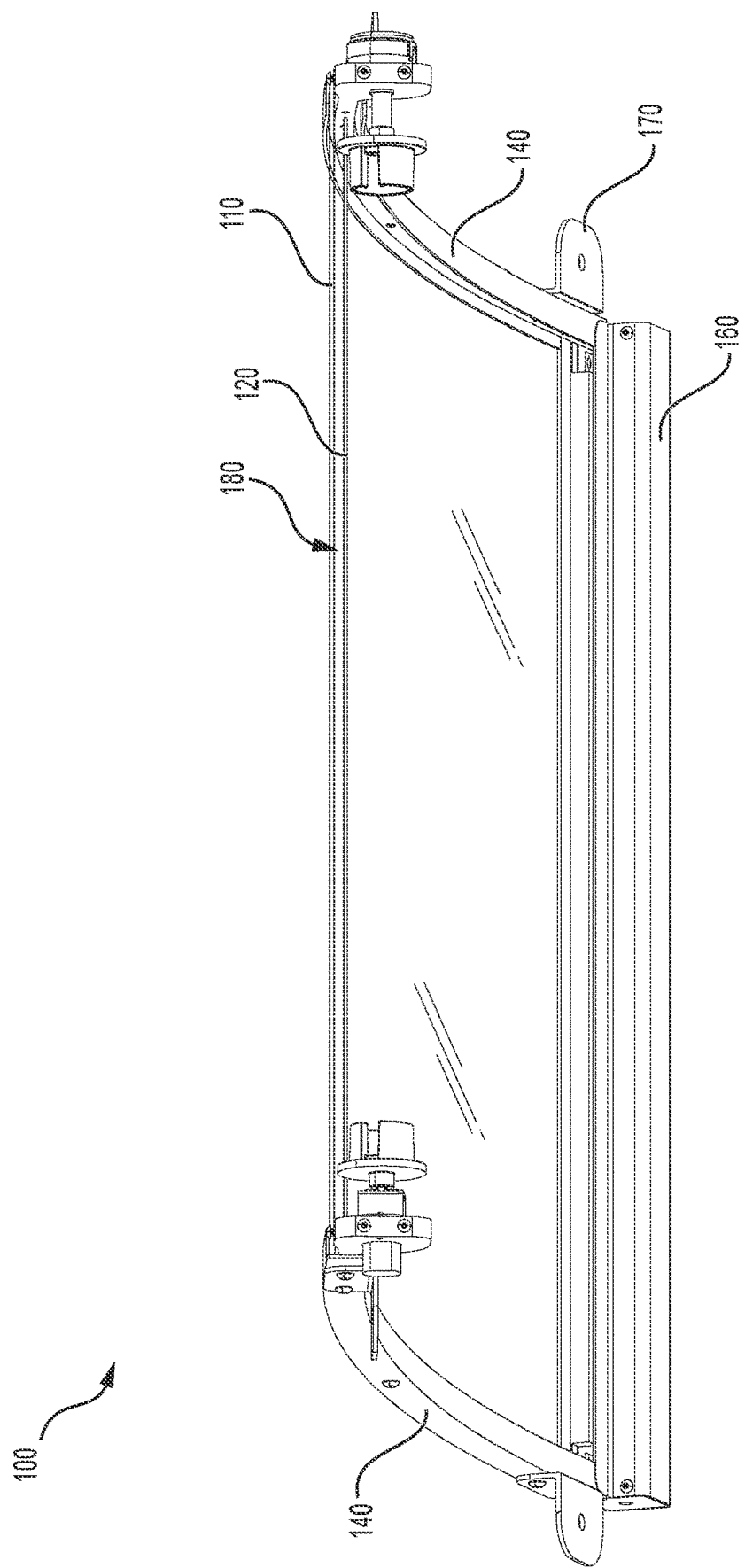
FIG. 2 is a bottom view showing the window roller shade and dimming pane assembly of FIG. 1.

FIG. 2 shows a bottom view of window roller shade and dimming pane assembly 100 with bottom cover 150 removed for clarity of illustration. The FIG. 2 view illustrates a curvature of window assembly 100. The curvature of window assembly 100 may be configured to align with an overall shape of an aircraft fuselage and frame. Side members 140, outer pane 110, and inner pane 120 are configured to fit this curve when assembled, as can be seen in FIG. 2. Outer pane 110 and inner pane 120 are held in place by side members 140 with a gap 180 between outer pane 110 and inner pane 120.

Figure 3:
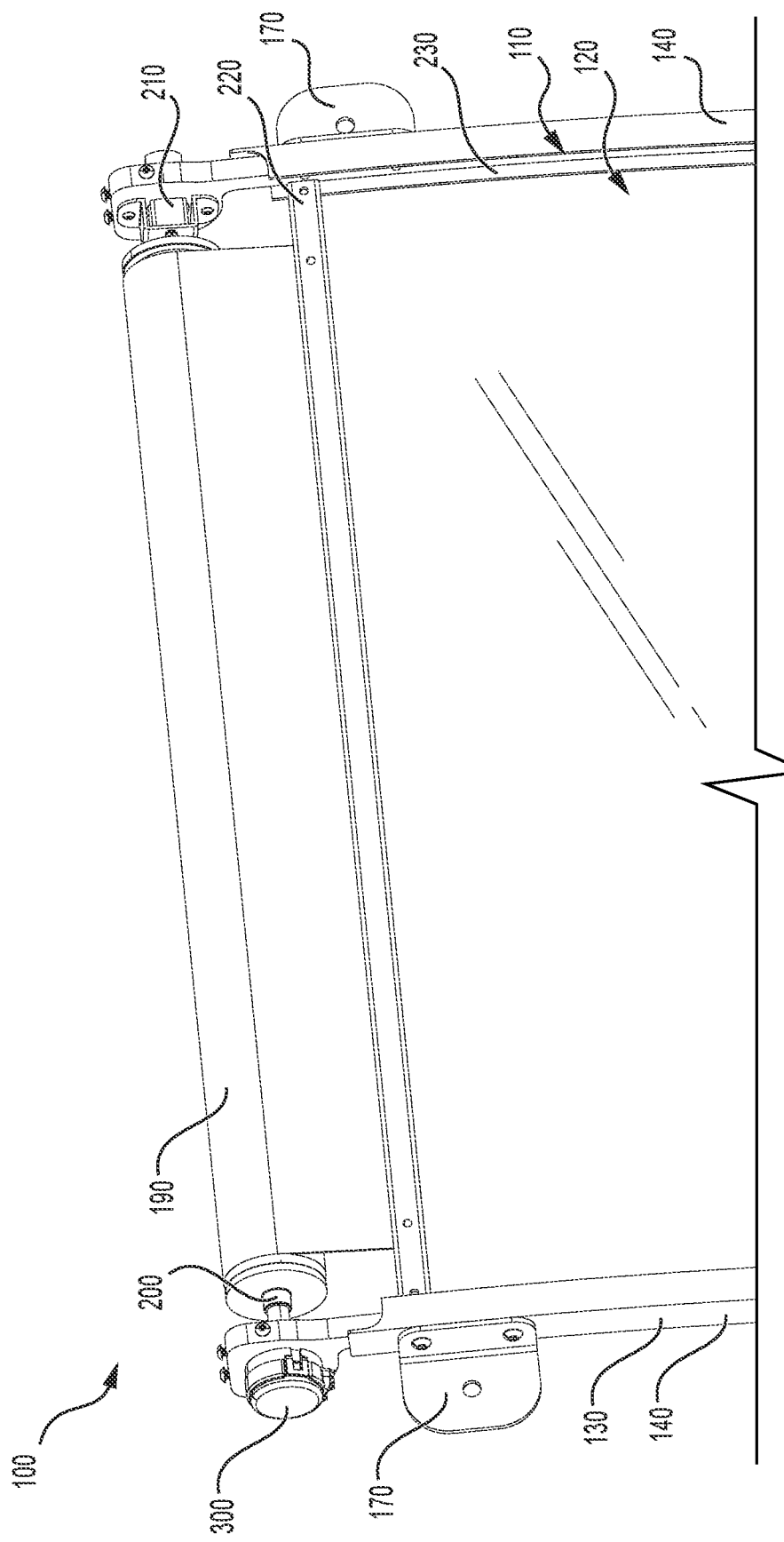
FIG. 3 is a close-up view showing a roller shade of the window roller shade and dimming pane assembly of FIG. 1 in a stowed position.

FIG. 3 provides a close-up view of a roller shade 190 of the window roller shade and dimming pane assembly 100 in a stowed position. In FIG. 3, top cover 160 has been removed to reveal inner workings of roller shade 190. Roller shade 190 comprises a flexible fabric, such as canvas, wool, polyester, or other fabrics generally appropriate for use in shades or curtains. In embodiments, the fabric of roller shade 190 provides a blackout shade that is substantially opaque for substantially blocking most or all light. The fabric on roller shade 190 is rolled upon an axle 200 in a stowed mode as shown in FIG. 3, and the fabric is unrolled from axle 200 in a deployed mode (see FIG. 4). Axle 200 is rotatably coupled to frame 130 for rotating about its longitudinal axis. A motor 210 is configured to rotate axle 200 in either direction for rolling or unrolling the fabric. In an embodiment, motor 210 comprises an electric motor. When motor 210 is activated, such as by an electrical current and/or an electrical signal, axle 200 rotates to roll or unroll roller shade 190. In embodiments, a gear box (not shown) is operatively coupled to motor 210 and axle 200 and is configured for rotating axle 200 at a preferred rotation rate while operating motor 210 at a preferred speed. In certain embodiments, motor 210 is located inside the roller tube instead of instead of being externally located (e.g., as shown on frame 130 in FIG. 3).

A trim bar 220 is mechanically coupled to a bottom edge of roller shade 190. Trim bar 220 may comprise a rigid bar made of metal or other similarly sturdy material; the rigid bar is fastened along a trim edge of fabric. For example, trim bar 220 may be sewn into a pocket in the fabric at the bottom of roller shade 190. However other means of fastening trim bar 220 to roller shade 190 may be employed, such as with fasteners, glue, or other means. Trim bar 220 extends across a width between side members 140, and each end of trim bar 220 is aligned within a groove or slot extending longitudinally within each of the side members 140. In this manner, trim bar 220 is configured for sliding up and down between side members 140, and within the gap between inner pane 120 and outer pane 110, as roller shade 190 is rolled and unrolled, respectively.

Figure 4:
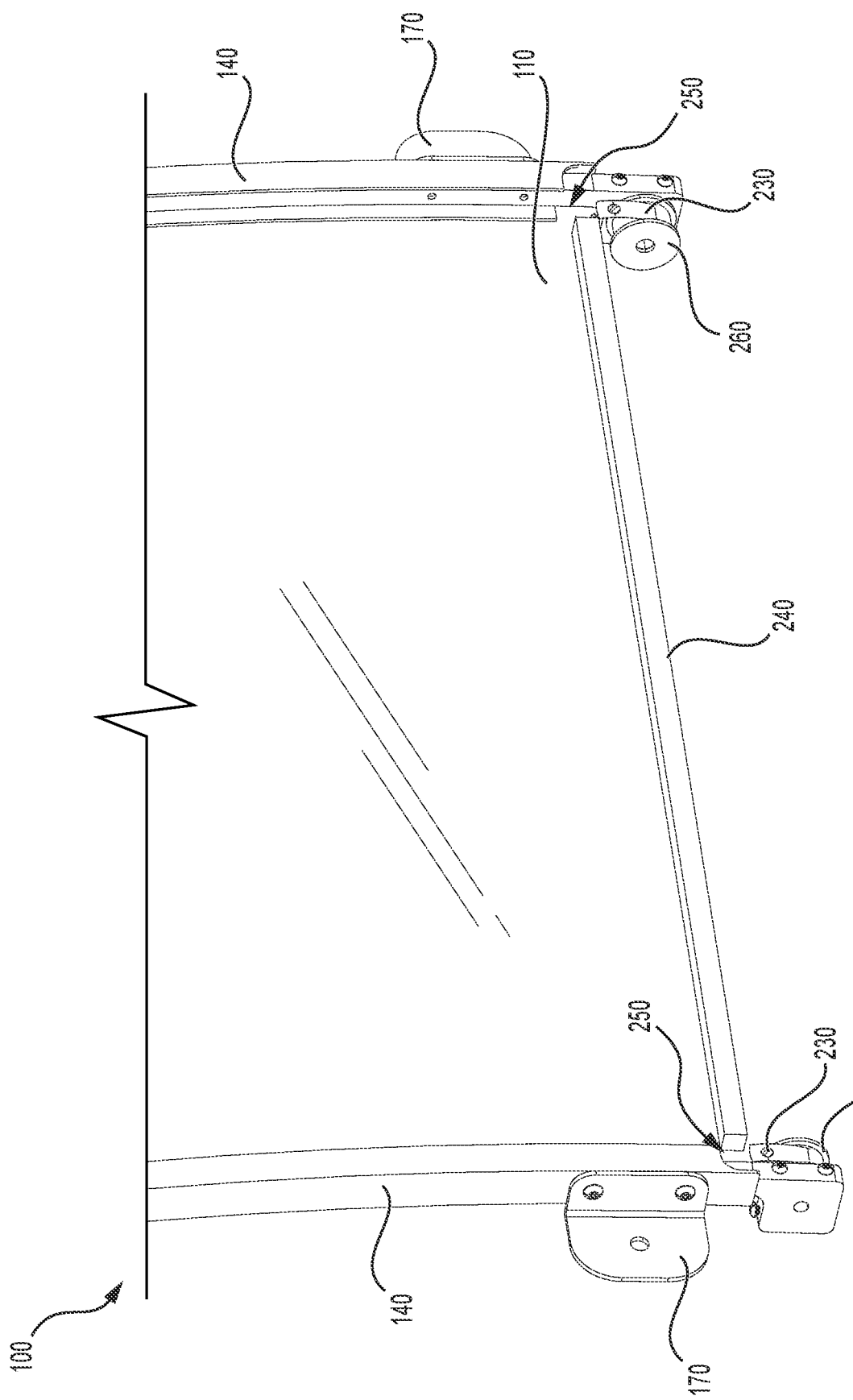
FIG. 4 is a close-up view showing the roller shade of the window roller shade and dimming pane assembly of FIG. 1 in the stowed position.

FIG. 4 provides a close-up view of roller shade 190 in the stowed position. In FIG. 4, bottom cover 150 has been removed to reveal an optional foam piece 240 and constant force springs 230. Each constant force spring 230 is mounted to an end of trim bar 220, as best viewed in FIG.

3, via fastening means such as screws, bolts, rivets, or other mounting means. Constant force springs 230 are rotatably coupled to frame 130 via wheels 260. Each wheel 260 comprises a rotational axis that enables a respective constant force spring 230 to be unwound and extended or rewound and stowed as trim bar 220 moves up and down within gap 180. Constant force springs 230 provide a biasing force for unrolling roller shade 190, which assists with deploying roller shade 190 and pulls the fabric of roller shade 190 to remain taut against the force of motor 210. By maintaining roller shade 190 taut, any unrolled portion of roller shade 190 avoids creasing or unwanted deformation of the fabric.

In embodiments, optional foam piece 240 is disposed between outer pane 110 and inner pane 120 along their bottom edge, as shown in FIG. 4. Gaps 250 are provided between frame 130 and each end of foam piece 240 to enable constant force springs 230 to travel up and down with roller shade 190. In embodiments, foam piece 240 assists with maintaining gap 180 between outer pane 110 and inner pane 120. Additionally, optional foam piece 240 provides a seal for preventing dust from entering the gap 180 between outer pane 110 and inner pane 120.

Figure 5:
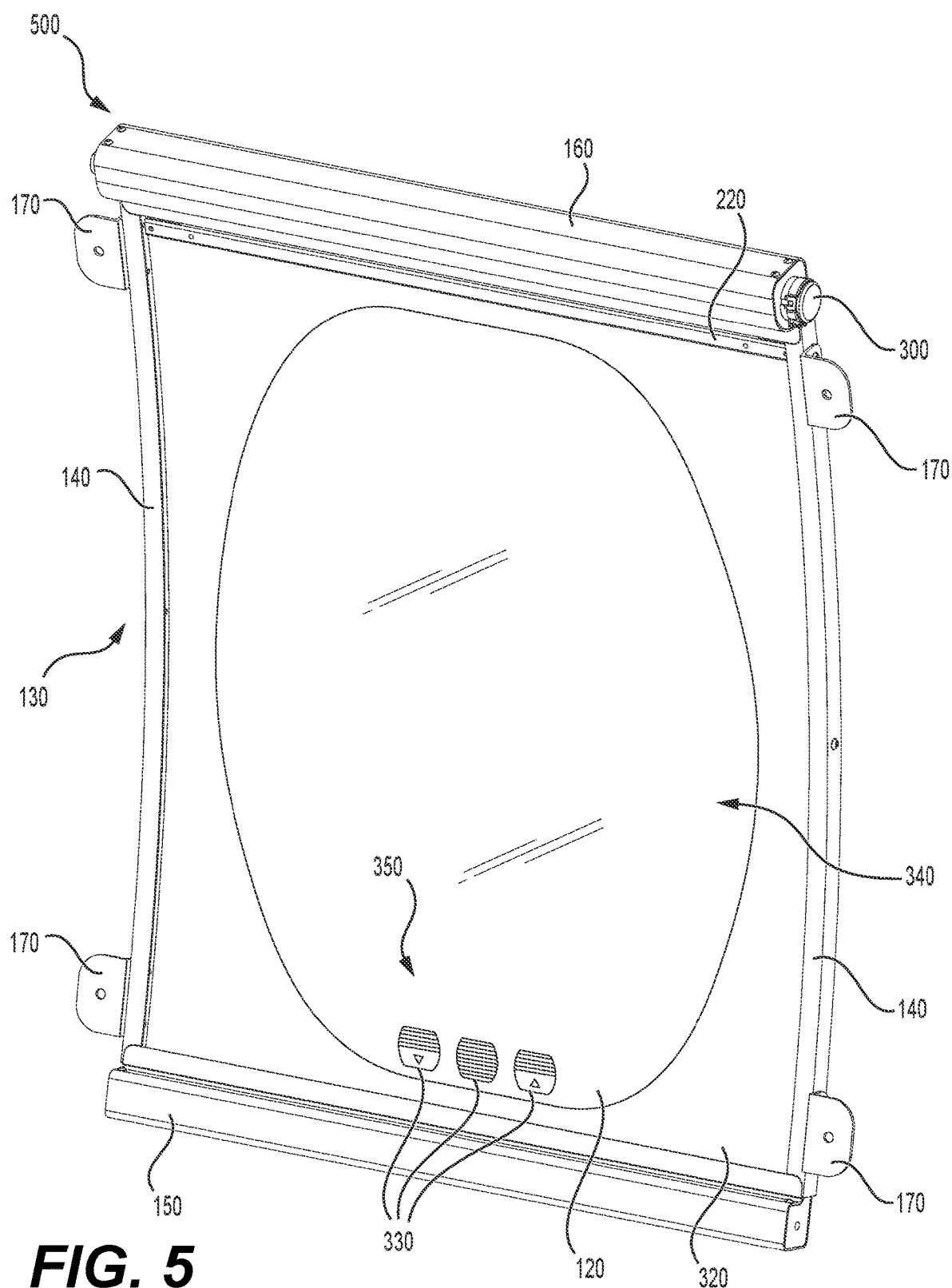
FIG. 5 is a perspective view showing an inner side of a window roller shade and dimming pane assembly, in an embodiment.

FIG. 5 shows an inner side of a window roller shade and dimming pane assembly 500, which is an example of window roller shade and dimming pane assembly 100, FIG. 1. Items enumerated with like numerals are the same or similar and their description may not be repeated accordingly. A mask 320 comprises a curved sheet having an opening 340, such as a substantially elliptical cutout, as shown in FIG. 5 for example. Mask 320 is configured to fit within frame 130. In embodiments, mask 320 is disposed in gap 180 between outer pane 110 and inner pane 120. Alternatively, mask 320 is disposed against an inner side of inner pane 120. Mask 320 may be supported by frame 130 and/or inner pane 120. In embodiments, mask 320 is adhered to one side of inner pane 120.

In embodiments, the user interface for controlling window roller shade and dimming pane assembly 500 comprises a window interface 350 having a plurality of icons 330 disposed on inner pane 120. For example, icons 330 may be stickered, etched, painted, or otherwise displayed on inner pane 120. Icons 330 are configured to represent buttons for controlling functionalities of window roller shade and dimming pane assembly 500. In combination with icon 330, window interface 350 comprises a mechanism for detecting a user input, such as a contactless position sensor or a capacitive touch technology, as further described below.

In operation, motor 210 turns axle 200 to roll and unroll roller shade 190. Specifically, to deploy roller shade 190, motor 210 is commanded to turn in a first direction to unroll the fabric of roller shade 190, while constant force springs 230 pull the fabric via trim bar 220. Motor 210 may be commanded to stop during deployment with roller shade 190 only partially deployed at any position between fully stowed and fully deployed, as further described below. To stow roller shade 190, motor 210 is commanded to turn in a second direction opposite the first direction, which rolls the fabric of roller shade 190 around axle 200. While stowing, motor 210 overcomes the biasing force of constant force springs 230 to unroll them from wheels 260. Again, motor 210 may be commanded to stop at any position while stowing to maintain the shade at a desired position. While roller shade 190 is being stowed and deployed, ends of trim bar 220 extend into slots or grooves of side members 140 to guide movement of trim bar 220 and thus the fabric of roller shade 190.

To command motor 210, an electrical signal is provided. The electrical signal may be provided via a user interface such as one or more buttons or switches. In some embodiments, a controller is communicatively coupled with motor 210 and the user interface. The controller provides commands to motor 210 based in part on input received from the user interface for controlling roller shade 190. In embodiments, the controller is housed in bottom cover 150. The controller is for example a microcontroller, microprocessor, field-programmable gate array (FPGA) or programmable logic controller (PLC) having a memory, including a non-transitory medium for storing software, and a processor for executing instructions of software. Memory may be used to store information and instructions of software. The software instructions may include but are not limited to algorithms, lookup table, and models. For example, controller may store instructions in memory for customizing roller shade 190 configurations to accommodate personal preferences of individual users, which may then be reused on subsequent flights. Controller may be embodied in one or more printed circuit boards (PCBs) and/or integrated circuits (ICs). Controller is not limited by the materials from which it is formed or the processing mechanisms employed therein and, as such, may be implemented via semiconductor(s) and/or transistors (e.g., electronic integrated circuits (ICs)), etc.

A contactless position sensor may be integrated within window assembly 500 as part of window interface 350. For example, a light curtain may be projected between top cover 160 and bottom cover 150 adjacent inner pane 120. The light curtain may be provided via one or more infrared (IR) light sources. One or more receivers are configured to sense the IR light. Therefore, when the light curtain is broken, for example by a user reaching for one of icons 330 with a finger, information from the one or more receivers may be used to determine which icon the user intended to touch. Therefore, the icons together with the light curtain provide the functionality of buttons. In embodiments, an array of IR transceivers are disposed along a top of inner pane 120 (e.g., along a bottom of top cover 160). The array of IR transceivers transmits IR light and receives reflected IR light. When a portion of the IR light curtain is broken (e.g., by a user's finger), the reflected IR light is intercepted preventing it from reaching the receiver. The controller then determines which one of icons 330 was touched, although the icon itself does not actually need to be touched as long as the light curtain is broken. In this manner, the controller receives a user input. In embodiments, the controller determines an x-y position (e.g., horizontal and vertical) at which the light curtain has been broken. If the x-y position corresponds to one of icons 330, controller determines that an input has been provided based on which icon is located at that particular x-y position.

Alternatively, a capacitive touch technology is provided as part of window interface 350 on inner pane 120 for receiving touch input. For example, inner pane may be configured as a capacitive touch sensor (e.g., a capacitive touch digitizer) configured for receiving touch input. Position detection and icons displayed on the inner pane function in a similar manner to the alternative light curtain embodiment described above.

Icons 330 may be configured to indicate various tasks to be performed by window assembly 500. For example, icons 330 may comprise an up arrow and a down arrow for instructing roller shade 190 to move upwards or downwards. Additionally, icons 330 may comprise a brightness indicator for adjusting a level of transparency or darkness of the window. For example, outer pane 110 or inner pane 120 may comprise a dimming film configured for increasing or decreasing a level of transparency of the window, which also increases or decreases an intensity of light passing through the window. In embodiments, a level of transparency provided by the dimming film is electrically adjustable. For example, an electrically-dimmable film may comprise an electrochromic material, such that the optical properties of the material are changed upon application or removal of an electrical current. The dimming film may darken to become more opaque and alternately lighten to become more translucent.

In embodiments, the controller is configured to determine position of roller shade 190 based on one or more sensors, and to control movement and limits of roller shade 190 (e.g., at a top position and a bottom position of the window). For example, controller may be configured to execute a startup routine and other automated functions of roller shade 190 and the dimming film.

In embodiments, an optical encoder 300 is provided for determining how many times roller shade 190 is rotated about axle 200 during deployment and stowing. For example, optical encoder 300 comprises a light sensor configured to monitor rotation of axle 200. In embodiments, optical encoder 300 is mounted at one end of axle 200, opposite motor 210, within top cover 160 (see FIG. 5). A marking may be disposed on axle 200 to assist optical encoder 300 with detecting each rotation. Optical encoder 300 is communicatively coupled with the controller. The controller is configured to determine rotations of axle 200 based on information received from optical encoder 300. The controller is also configured to determine how far roller shade 190 has been deployed based on the number of times axle 200 has been rotated from a home position (e.g., a known or zero set point), as further described below.

In embodiments, a proximity sensor (e.g., inductive, time of flight, photoelectric, or ultrasonic) may be integrated along one or both side members 140 for detecting a position of the trim bar and/or a bottom edge of the roller shade 190. Alternatively, one or more Hall effect sensors are provided along one or both side members 140, and one or more magnets are disposed on trim bar 220 for detection via the Hall effect sensors. The controller is communicatively coupled with the proximity sensor or Hall effect sensor(s). Based on the known location of the proximity or Hall effect sensor, the controller determines a position of the bottom edge of roller shade 190. In certain embodiments, a pair of proximity sensors (not shown) may be disposed within bottom cover 150 on opposite sides of frame 130. When roller shade 190 is moved to the fully deployed position, the proximity sensors sense its position and the controller determines that roller shade 190 is fully deployed. Additionally, in some embodiments, a pair of Hall Effect sensors are vertically staggered on the same side of frame 130; with the vertical arrangement, the upper sensor signals the controller when roller shade 190 is approaching the lower sensor, and the lower sensor sends a separate signal when the roller shade 190 is fully deployed.

In operation, the controller may command motor 210 to deploy roller shade 190 until the Hall Effect sensors detect the magnet on trim bar 220 establishing that roller shade 190 is fully deployed. In embodiments, the controller may instruct motor 210 to slow the rate of unrolling upon receiving a signal from an upper sensor during deployment (i.e., for the vertical sensor arrangement embodiment) to slowly approach the fully deployed position. Once the fully deployed position is reached, the controller may set a known zero point or reference position. Then, as motor 210 is used to partially or fully stow roller shade 190, the optical encoder counts rotations of axle 200 and the controller determines a position of roller shade 190 with respect to the known zero/reference position.

Figure 6:
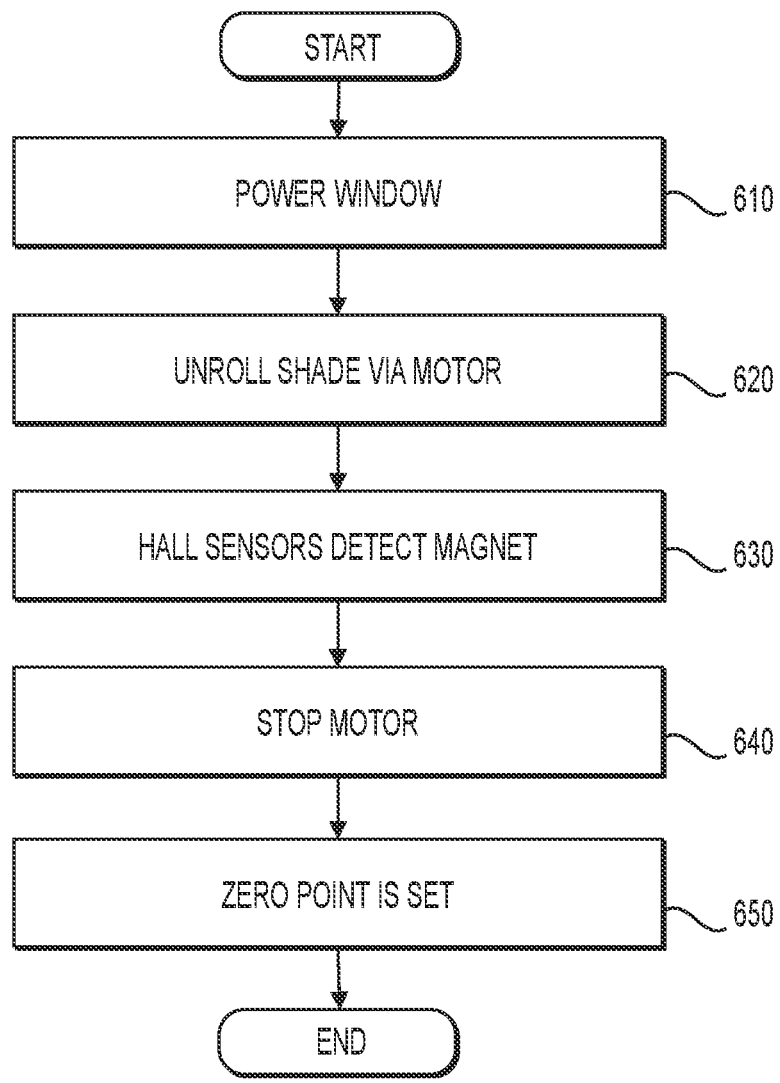
FIG. 6 shows a method for initiating a position of the window roller shade and dimming pane assembly of FIG. 1, in an embodiment.

FIG. 6 shows a position initiation method 600 for use with window roller shade and dimming pane assembly 100 of FIG. 1 or window roller shade and dimming pane assembly 500 of FIG. 5, for example.

Upon starting, in a step 610, electrical power is supplied. In an example of step 610, electrical power is supplied to the window roller shade and dimming pane assembly 100 of FIG. 1. Upon being powered, the controller automatically sends a command to motor 210 to unroll roller shade 190.

In a step 620, the motor unrolls the window roller shade. In an example of step 620, motor 210, having received a command from the controller in step 610, operates to unroll roller shade 190.

In a step 630, a position of the window roller shade is detected. In an example of step 630, proximity sensors are disposed along the first side member and/or the second side member for detecting a position of a bottom edge of roller shade 190. In another example of step 630, Hall Effect sensors detect a magnet on trim bar 220, indicating that roller shade 190 is in a fully deployed position.

In a step 640, the motor is stopped. In an example of step 640, the controller sends a signal to motor 210 to stop operating.

In a step 650, a reference position is set. In an example of step 650, the controller performs an auto routine to home to a known position for setting a reference position or 'zero-point'. For example, the fully deployed roller shade position may be used to establish the reference position. Based on the reference position, optical encoder 300 may be used to count revolutions of axle 200 and the controller can then determine the actual position of roller shade 190 during deployment and stowing, as described below in connection with FIGS. 7 and 8. Once the reference position is set, position initiation method 600 ends.

Figure 7:
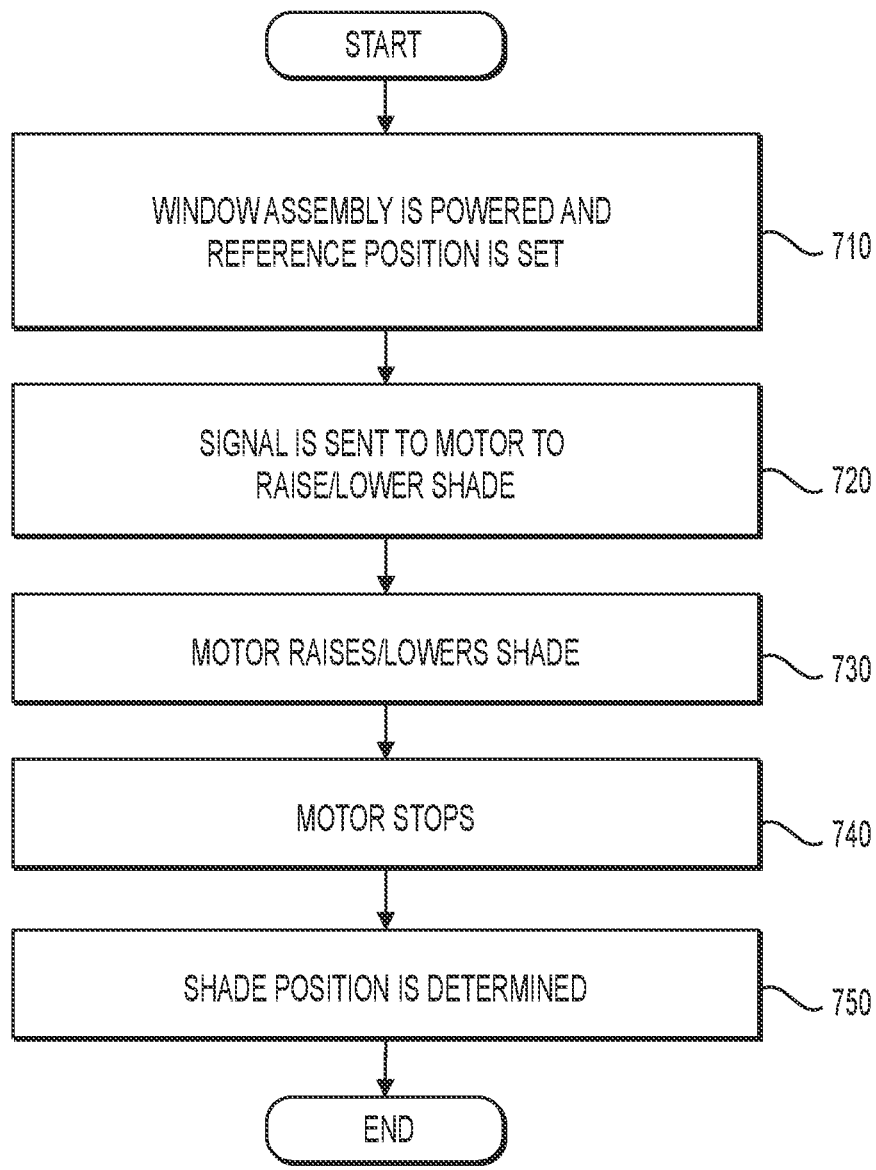
FIG. 7 shows an embodiment method for operating the window roller shade and dimming pane assembly of FIG. 1.

FIG. 7 shows an exemplary operating method 700 for use with window roller shade and dimming pane assembly 100 of FIG. 1 or window roller shade and dimming pane assembly 500 of FIG. 5, for example.

Upon starting, in a step 710, the window roller shade and dimming pane assembly has been powered up and a reference position for the shade has been set to initiate operation. In an example of step 710, the position initiation method 600 of FIG. 6 has been performed to power up window assembly 100 and set the reference position. Once operation has been established, roller shade 190 may then be at any position of deployment, including fully stowed, fully deployed, or partially deployed, while the next steps of method 700 are performed.

At a step 720, a signal is sent to the motor to roll or unroll roller shade 190. In an example of step 720, the controller sends a signal to motor 210 to operate in a first direction for rolling roller shade 190 (e.g., raising the shade) or to operate in a second direction for unrolling roller shade 190 (e.g., lowering the shade). The controller may receive an indication for which way to operate motor 210 via an electrical switch or other user interface. More than one switch or user interface may be configured to operate window assembly 100. For example, a passenger seated by the window assembly may have a switch or touchscreen display located on an armrest of the seat; another user interface may be provided on a mobile device such as a smartphone; an interface may be provided on the inner pane of the window, such as window interface 350 described above in connection with FIG. 5. Additionally, a crew member not seated by the window assembly 100 may have one or more interfaces (e.g., in the cockpit) for controlling the window assembly 100.

In embodiments, the controller is programmed to automatically operate motor 210 for adjusting a height of roller shade 190. For example, the controller may send a signal to motor 210 based on certain phases of flight. The controller may receive an indication of the phase of flight from an avionics system onboard the aircraft. The controller may then determine whether to raise or lower roller shade 190 by operating motor 210 appropriately. For example, upon takeoff and landing, the controller may instruct motor 210 to open roller shade 190.

In a step 730, the motor raises or lowers the roller shade. In an example of step 730, motor 210 operates to raise or lower roller shade 190.

In a step 740, the motor is stopped. In an example of step 740, motor 210 is commanded to stop by the controller. The position at which to stop raising or lowering roller shade 190 may be determined by the controller automatically or determined by the controller based on user input received by the controller. Once roller shade 190 is at a final position, method 700 ends.

In a step 750, a position of the shade is determined. In an example of step 750, optical encoder 300 counts the rotations of axle 200 as roller shade 190 is raised or lowered via motor 210. Based on the number of rotations of axle 200, the controller determines a position of the bottom edge of roller shade 190. Once the position of the shade is determined, operating method 700 ends.

In embodiments, the controller stores limit positions for automatically stopping motor 210. For example, when the position of the bottom edge of roller shade 190 reaches the bottom of frame 130 (e.g., at bottom cover 150) or the top of frame 130 (e.g., at top cover 160), the controller sends a signal to stop rotation of motor 210 and prevent damage or jamming of the roller shade.

Figure 8:
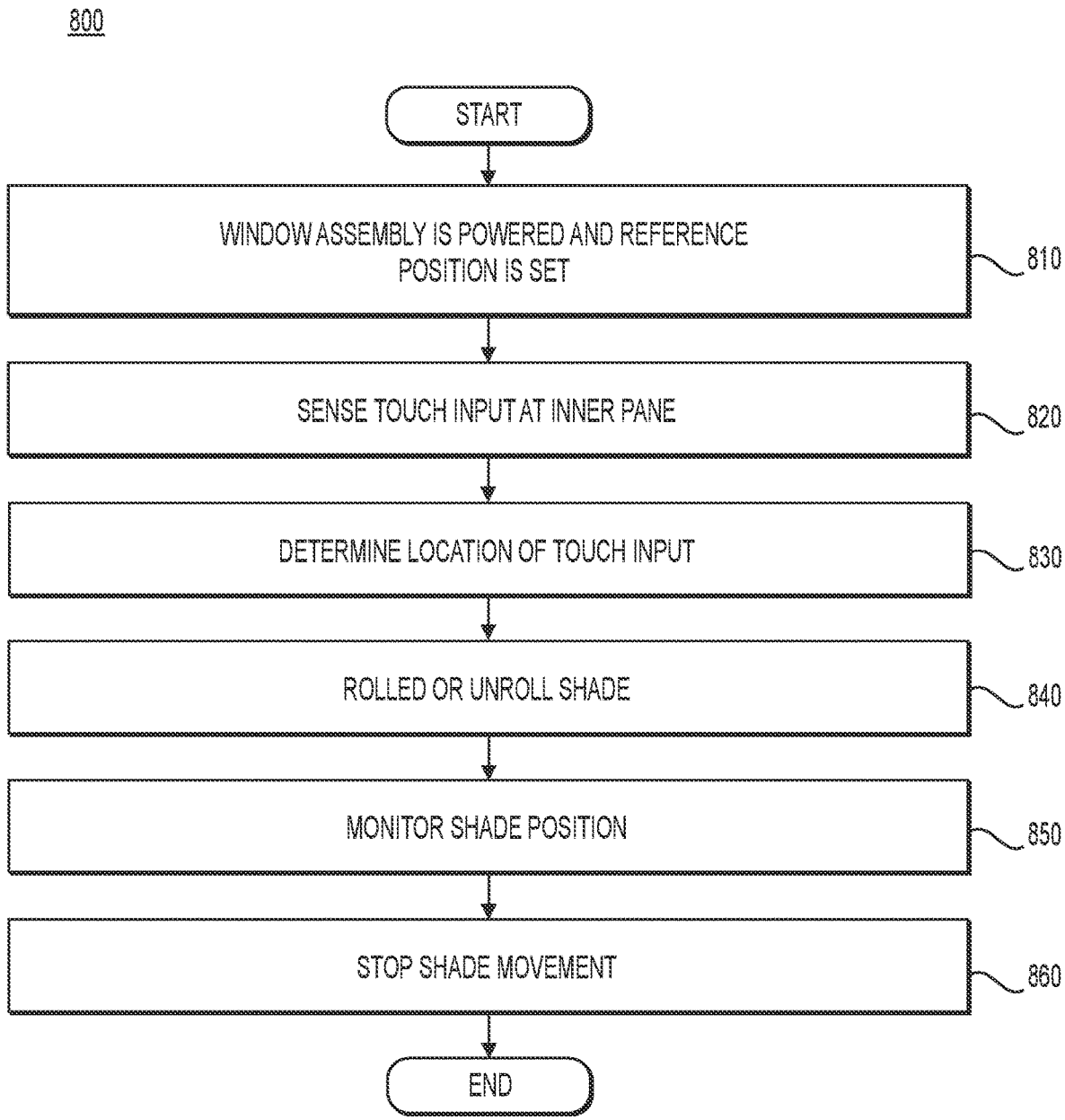
FIG. 8 shows another embodiment method for operating the window roller shade and dimming pane assembly of FIG. 1.

FIG. 8 shows another exemplary operating method 800 for use with window roller shade and dimming pane assembly 100 of FIG. 1 or window roller shade and dimming pane assembly 500 of FIG. 5, for example. Operating method 800 is configured for use with a mechanism for detecting touch on inner pane 120 such as a contactless position sensor or capacitive touch sensor.

When operating method 800 starts, in a step 810, the window roller shade and dimming pane assembly has been powered up and a reference position for the shade has been set to initiate operation. Step 810 is an example of step 710 of FIG. 7 described above.

At a step 820, a touch input is sensed at an inner pane of a window. In an example of step 820, a touch input is sensed at inner pane 120 a contactless position sensor or capacitive touch sensor. For a contactless position sensor or the like, when the light curtain is broken (e.g., by a user's finger), transceivers detect that light from one or more IR light sources has been intercepted and provide appropriate information to the controller. For a capacitive touch sensor or the like, a touch input is received and appropriate information is provided to the controller. The capacitive touch sensor may include a capacitive film adhered to the inner pane or the capacitive touch sensor may be molded into the inner pane.

In a step 830, the controller determines a location of the touch input. In an example of step 830, the controller determines an x-y position on inner pane 120 based on information received from IR transceivers of the contactless position sensor. In another example of step 830, the controller determines an x-y position on inner pane 120 based on information received from the capacitive touch sensor.

In a step 840, the controller instructs the motor to raise or lower the shade. In an example of step 840, the controller instructs motor 210 to operate in a first direction to roll roller shade 190 or to operate in a second direction to unroll roller shade 190.

In a step 850, the shade position is monitored. In an example of step 850, optical encoder 300 monitors rotations of axle 200 and the controller determines the position of roller shade 190 based on the number of rotations.

In a step 860, movement of the shade is stopped. In an example of step 860, the controller instructs motor 210 to stop rotating, which stops roller shade 190 from raising or lowering at the desired position. Once roller shade 190 reaches the desired position, operating method 800 ends.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A window roller shade and dimming pane assembly, comprising:
   a rigid frame having a first side member on a first side and a second side member on a second side opposite the first side;
   an outer pane and an inner pane within the rigid frame, wherein a gap exists between the outer pane and the inner pane;
   a roller shade disposed at a top of the rigid frame, wherein the roller shade comprises a motor for rolling and unrolling the roller shade;
   a first constant force spring rotatably coupled to a bottom portion of the first side member and fixedly coupled to a bottom of the roller shade;
   a second constant force spring rotatably coupled to a bottom portion of the second side member and fixedly coupled to a bottom of the roller shade, wherein the first constant force spring and the second constant force spring are configured to pull the roller shade downwardly through the gap while the motor is unrolling the roller shade;
   a dimming film disposed on the inner pane for dimming light through the inner pane; and
   a window interface operatively coupled to the inner pane for receiving touch input for controlling the dimming film and the roller shade.

2. The assembly of claim 1 wherein the rigid frame comprises a curvature configured to align with a shape of an aircraft fuselage.

3. The assembly of claim 1 comprising a trim bar mechanically coupled to a bottom edge of the roller shade, wherein each of the first side member and the second side member comprises a groove configured to receive an end of the trim bar.

4. The assembly of claim 3 comprising a proximity sensor disposed along the first side member for detecting a position of a bottom edge of the roller shade.

5. The assembly of claim 1 comprising a foam piece disposed in the gap between the outer pane and the inner pane along a bottom edge of the outer pane and the inner pane, wherein the foam piece provides a seal for preventing dust from entering the gap between outer pane and the inner pane.

6. The assembly of claim 1 wherein the window interface comprises a plurality of icons disposed on the inner pane.

7. The assembly of claim 6 wherein the window interface comprises a contactless position sensor configured to determine which of the plurality of icons are touched by a user's finger.

8. The assembly of claim 6 wherein the window interface comprises a capacitive touch technology configured to receive touch input from a user at each of the plurality of icons.

9. The assembly of claim 1 comprising an optical encoder mounted on one end of the roller shade, wherein the optical encoder is configured for determining a number of times the roller shade is rotated during deployment and stowing.

* * * * *